United States Patent
Davis

[15] 3,700,330
[45] Oct. 24, 1972

[54] ELECTRO-OPTICAL VEHICLE EXHAUST PARTICULATE MONITOR

[72] Inventor: Roger C. Davis, Flint, Mich.
[73] Assignee: General Motors Corporation, Detroit, Mich.
[22] Filed: Oct. 13, 1971
[21] Appl. No.: 188,849

[52] U.S. Cl. .................356/38, 250/218, 356/102, 356/197, 356/205, 356/207
[51] Int. Cl......G01n 1/00, G01n 15/02, G01n 21/12
[58] Field of Search .....340/237 S; 356/38, 102, 103, 356/104, 196, 197, 201, 205, 206, 207; 250/218

[56] References Cited
UNITED STATES PATENTS
3,207,026 9/1965 Churchill et al............356/206

Primary Examiner—Ronald L. Wibert
Assistant Examiner—V. P. McGraw
Attorney—Jean L. Carpenter et al.

[57] ABSTRACT

A device for measuring the particulates entrained in a gaseous stream includes a rotating transparent cylinder through which the gases pass, a supply of dry ionized air for admixture with the gaseous stream to charge the particles entrained in the stream and a pair of electrodes adjacent the rotating cylinder for establishing an electrostatic field to precipitate the particles onto the cylinder wall. An optical scanning device then measures the collected particulate according to the attenuation of light beams passing through the cylinder wall.

3 Claims, 4 Drawing Figures

Patented Oct. 24, 1972

3,700,330

INVENTOR.
Roger C. Davis
BY
Warren D. Hill
ATTORNEY

ELECTRO-OPTICAL VEHICLE EXHAUST PARTICULATE MONITOR

This invention relates to electro-optical apparatus for measuring particulate matter entrained in a gaseous stream and particularly to an apparatus for measuring vehicle exhaust particulates.

In order to assist in the design of vehicles for minimum exhaust emissions and to test the emissions of vehicles already produced, it is desirable to measure the particulate matter entrained in a vehicle exhaust since the particulates are one type of emission which has been categorized as undesirable. Such particulates are both solid state and liquid state, the latter, however, including water since it is not desired that the presence of water influence the measurement of particulate matter. The particulates may range in size from less than one micron to several microns with the major portion of the particulates being distributed in the range of one to four microns. Requirements of a successful measuring device include: (1) there must be no affect on the operation of the vehicle, (2) there must be intermodal measurement capability, (3) the device must be capable of taking a large sample of exhaust gases and (4) the device must not be sensitive to water vapor condensed from the exhaust gases.

It is an object of this invention to provide an electrooptical apparatus for measuring particulate matter entrained in a gaseous stream.

It is another object of the invention to provide such an apparatus which has a sufficiently large gas flow capacity that it is not restricted to small samples of say, an automotive exhaust.

Another object of the invention is to provide such an apparatus which is not subject to errors caused by water vapor condensate.

The invention is carried out by providing a rotating transparent cylinder through which the particle-containing gas stream passes and a pair of electrodes adjoining the cylinder for establishing an electrical field to precipitate particulates from the gas onto the cylinder wall, a device for electrically charging the particles within the gas stream and an optical arrangement including at least one light source and detector on opposite sides of the cylinder for scanning the cylinder wall and the coating of particulates accumulated thereon so that the attenuation of the light reaching the detector is a function of the amount of particulates deposited on the wall. The invention further contemplates a source of dry dilutant air for maintaining the gas within the cylinder above the dew point and includes an ionizer for ionizing the dry air which in turn transfers electrical charges to the particles within the gas stream to assist in the particle precipitation.

The above and other advantages will be made more apparent from the following detailed description and drawings wherein like reference numerals refer to like parts and wherein.

Figure 1:
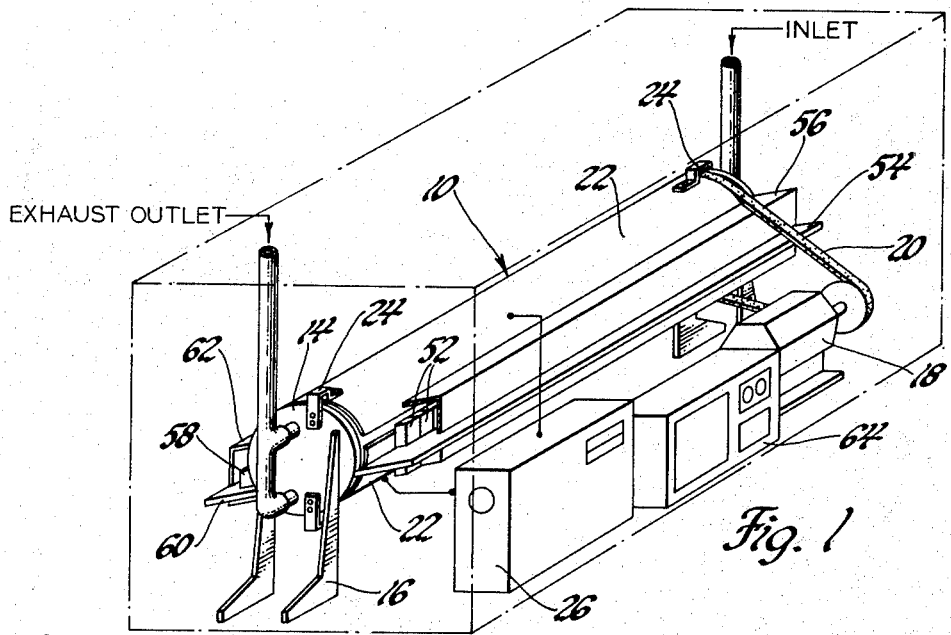
FIG. 1 is a perspective view of a particle monitoring system according to the invention.
Figure 2:
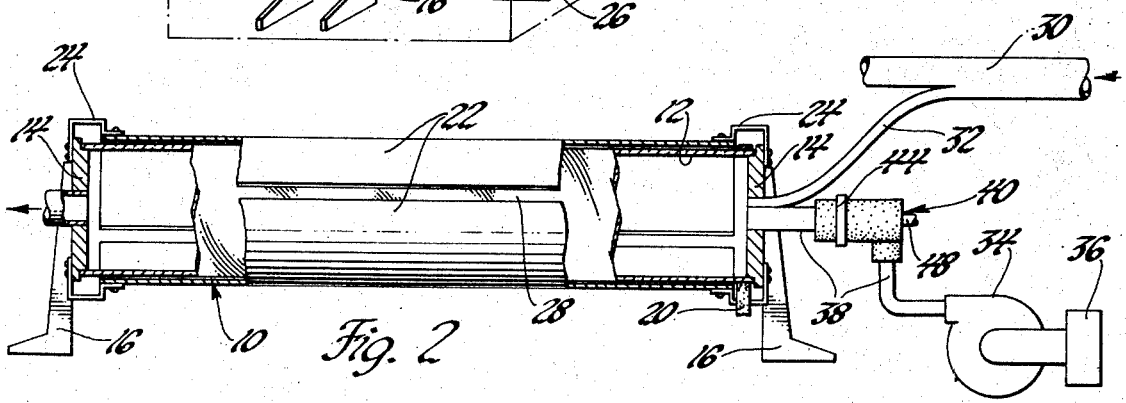
FIG. 2 is a partly broken away sectional view of the particle collecting chamber of FIG. 1 and a schematic view of the gas supply thereto.

Referring to FIGS. 1 and 2, there is shown a particle collection chamber 10 which includes a rotatable transparent cylinder 12, preferably of glass, journaled at either end on stationary end plates 14, which end plates are held by support members 16. The cylinder 12 is rotatably driven by a motor 18 and a belt 20. A pair of semicylindrical electrodes 22 are slightly spaced from the cylinder 12 and are secured to the end plates by brackets 24. The electrodes are connected to opposite poles of a high voltage power supply 26. The electrodes 22 are spaced at their adjacent edges to define a pair of diametrically opposed gaps 28 of sufficient width to prevent arcing from one electrode to the other and further of sufficient width to allow optical scanning therethrough. If necessary dielectric material to prevent arcing may be inserted between the electrodes.

A proportioning exhaust conduit 30 carrying vehicle exhaust includes takeoff tube 32 for transmitting a sample of the exhaust gas into the collection chamber 10 through an aperture in an end plate 14. The tube 32 is sufficiently large that a representative sample of the exhaust gas is taken. A dilutant dry air supply includes a blower 34 having a filter 36 at its intake and a conduit 38 for carrying the dry air into the chamber 10 through an end wall 14.

Figure 3:
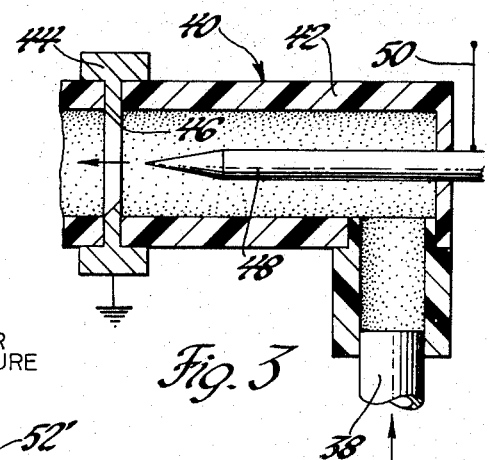
FIG. 3 is a cross-sectional view of an ionizing device within the dilutant air supply of FIG. 2; and, FIG. 4 is a schematic illustration of an alternate photo-optical system for detecting particulate accumulation within the collection chamber.

The conduit 38 includes an ionizing chamber 40 which is better shown in FIG. 3. The ionizing chamber 40 includes a wall 42 of insulating material which supports an annular electrode 44 connected electrically to ground and having a sharpened annular inner edge 46 projecting into the passage defined by the wall 42. A sharpened needle-like electrode 48 is also carried by the wall 42 and has its point terminating in the vicinity of the electrode 44 and on the central axis thereof. The electrode is connected by a line 50 to the power supply 26 for establishing a high voltage gradient between the electrode 48 and the electrode 44 so that a corona discharge takes place from the electrode 48 to ionize the dry air passing through the chamber 40.

Referring again to FIG. 1, a series of light sources 52 aligned along one of the gaps between the electrodes are mounted on a support plate 54 and encased in a housing 56. Each light source projects a beam of light through the glass cylinder and through the opposing gap to a corresponding photoelectric detector 58 similarly mounted on a support plate 60 and covered by a housing 62. Each detector 58 is connected to a data analyzer 64.

A collection chamber designed for maximum efficiency and having a flow rate of 100 CFM includes a glass cylinder 12 6 inches in diameter, 24 inches long and ⅛ inch wall thickness, with a 100 KV applied across the electrodes 22. The dilution air makes up 30 percent of the gas flow and it is ionized by placing a charging voltage of +5.5 KV on the electrode 48.

In operation, the voltages are applied to the several electrodes, the cylinder 12 is rotated by operating the motor 18, and the gas flow is started. Typically, the operating temperature of the collection chamber is 100° F. The addition of the dry dilutant air at the rate of 30 percent of the total gas flow keeps the dew point of the gas mixture below the operating temperature so that the water vapor in the exhaust gases will not condense and therefore will be not precipitated onto the cylinder wall. As the ionized dilutant air mixes with the exhaust gases, the particulates in the exhaust become charged by ion diffusion. The charged particulates then are acted upon by the electrostatic field between the electrodes 22 and are deposited on the cylinder wall. Due to the cylinder rotation, the accumulation of particulates around the cylinder tends to be uniform although there typically may be a variation along the axial dimension of the cylinder depending upon such things as the distribution of particle sizes. The coating of particulates on the cylinder wall attenuates the light beams from the light sources 52 impinging on the detectors 48 so that the detector outputs are then indicative of the amount of particulate accumulation during the time interval of operation and moreover, the rate of change of the detector signals indicates the rate of particulate deposition, which information is useful in determining the rate of particulate emissions during intermodal phases, i.e., during the various driving cycles such as acceleration. The detector outputs are added in the data analyzer 64 to provide an average reading of the particulate accumulation which is compared to an empirically determined calibration curve to provide the measurement of total particulates during the time interval of the test. Alternatively, the output of each individual detector may be compared to an empirical calibration curve to provide a measurement of the accumulation at that point along the cylinder and the several measurements are then combined to give the total accumulation. This is particularly useful where it is found that due to the nature of the several different constituents of the particles and their tendency to selectively deposit in certain axial regions of the cylinder, it is more accurate to provide a different calibration curve for each axial region.

Figure 4:
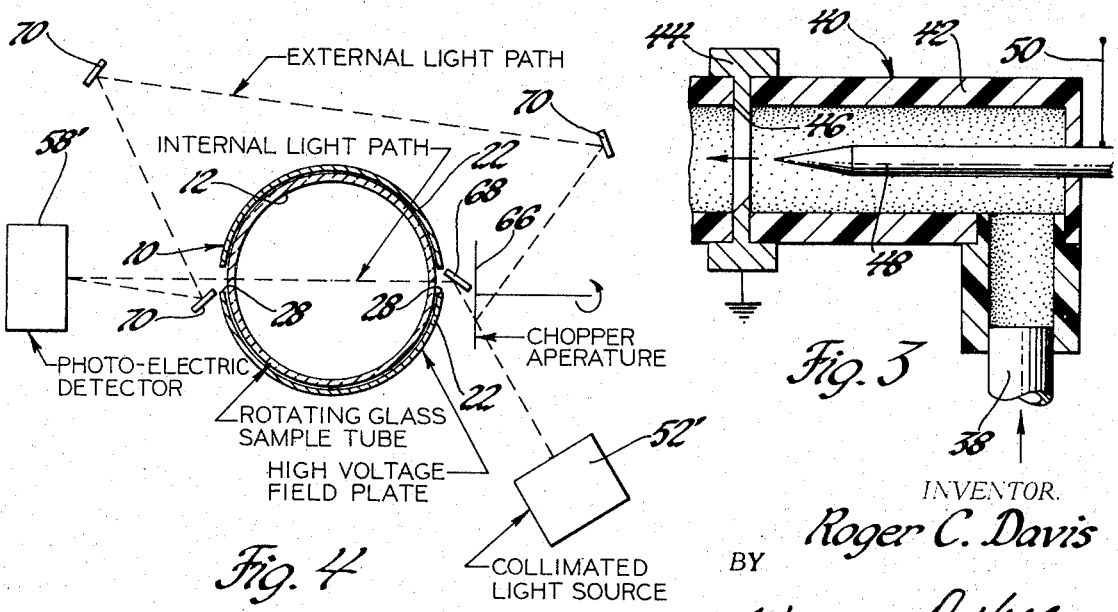

In the event that variations in light source intensity or electronic drift in the detectors tends to give erroneous readings, the optical arrangement of FIG. 4 may be utilized. There each light source 52' has associated therewith a rotating chopper 66 which alternately directs the light through an internal light path and an external light path. The internal light path includes a mirror 68 which reflects the light beam through the cylinder and onto the detector 58'. The external light path includes a reflecting surface on the chopper 66 and mirrors 70 which reflect the beam to the detector 58' through a path totally outside the cylinder 12. In use, before the test is begun and the collector cylinder is clean, the detector circuitry is adjusted so that the detector output voltage produced by both the internal beam and the external beam is identical. When the particulate material builds up on the cylinder, the two voltages are no longer the same so that an AC voltage will be produced at the detector, the voltage having a frequency (say 10Hz) determined by the chopper and an amplitude dependent on the particulate accumulation on the cylinder wall.

It will thus be seen that this invention provides an apparatus for efficiently collecting and measuring the particulate matter in a stream of gases, such as a vehicle exhaust, without affecting the operation of the vehicle and not being affected by the water vapor within the gas. In addition, the device utilizes a large proportion of the exhaust gases thereby avoiding the inherent inaccuracy of testing small samples and, by measuring the rate of change of accumulation, exhibits an intermodal measurement capability.

The embodiment of the invention described herein is for purposes of illustration and the scope of the invention is intended to be limited only by the following claims.

It is claimed:

1. An apparatus for measuring particulate matter entrained in a gaseous stream comprising
   a rotatable transparent cylinder,
   means for rotating the cylinder,
   means for passing at least a portion of the gaseous stream through the cylinder,
   means for electrically charging the particulate matter,
   means for establishing an electrical field for precipitating the particulate matter onto the cylinder wall so that the particulate accumulation therein is a function of the amount of particulate matter in the gaseous stream, and
   optical means including at least one light beam source for scanning the cylinder wall and photoelectrical detector means responsive to the light thereon for producing an electrical output in accordance with the beam intensity
   whereby the particulate accumulation attenuates the light beam and the output signal according to the amount of particulate matter entrained in the gaseous stream.

2. An apparatus for measuring particulate matter entrained in a gaseous stream comprising
   a rotatable transparent cylinder,
   means for rotating the cylinder,
   means for passing at least a portion of the gaseous stream through the cylinder,
   means for electrically charging the particulate matter,
   a pair of spaced stationary substantially semicylindrical electrodes disposed adjacent opposite sides of the cylinder and defining a pair of longitudinal gaps therebetween,
   a high voltage source connected across the electrodes for establishing an electrical field for precipitating the particulate matter onto the cylinder wall so that the particulate accumulation thereon is a function of the amount of particulate matter in the gaseous stream, and
   optical means including at least one light beam source directed through the gaps and through the cylinder for scanning the cylinder wall during cylinder rotation and photoelectric detector means responsive to the light beam for producing an electrical output in accordance with the beam intensity
   whereby the particulate accumulation attenuates the light beam and the output signal according to the amount of particulate matter entrained in the gaseous stream.

3. An apparatus for measuring particulate matter entrained in a gaseous stream comprising
   a rotatable transparent cylinder,
   means for rotating the cylinder,
   means for passing at least a portion of the gaseous stream through the cylinder,
   means for diluting the gaseous stream portion including a source of dilutant gas for supplying dilutant gas to the cylinder, means for electrically charging the particulate matter including means for ionizing the dilutant gas whereby the particulate matter becomes charged by associating with the ionized dilutant gas, a pair of spaced stationary substantially semicylindrical electrodes disposed adjacent opposite sides of the cylinder and defining a pair of longitudinal gaps therebetween, a high voltage source connected across the electrodes for establishing an electrical field for precipitating the particulate matter onto the cylinder wall so that the particulate accumulation thereon is a function of the amount of particulate matter in the gaseous stream, and optical means including a source of a plurality of light beams directed through the gaps and through the cylinder for scanning the cylinder wall during cylinder rotation and a plurality of photoelectric detectors each responsive to one of the light beams for producing in combination an electrical output signal in accordance with the beam intensity whereby the particulate accumulation attenuates the light beams and the output signal according to the amount of particulate matter entrained in the gaseous stream.

* * * * *